United States Patent [19]
Gross et al.

[11] Patent Number: 4,771,985
[45] Date of Patent: Sep. 20, 1988

[54] HAND-CONTROLLED FAUCET

[75] Inventors: Joseph Gross, Moshav Mazor; David Lowenstein, Nethanya; Menahem Tilman, Hofit; Etan Rosenberg, Kiryat; Alexander Morgulis, Herzlia, all of Israel

[73] Assignee: General Ideas & Products Ltd., Tel-Aviv, Israel

[21] Appl. No.: 101,212

[22] Filed: Sep. 25, 1987

[51] Int. Cl.⁴ .............................................. F16K 31/38
[52] U.S. Cl. ...................................... 251/38; 251/230; 251/339
[58] Field of Search ........................... 251/230, 339, 38

[56] References Cited
U.S. PATENT DOCUMENTS

| | | | |
|---|---|---|---|
| 3,220,695 | 11/1965 | Downey | 251/230 X |
| 3,652,053 | 3/1972 | Portras | 251/38 |
| 4,014,365 | 3/1977 | Peterson | 251/339 X |

Primary Examiner—Alan Cohan
Attorney, Agent, or Firm—Benjamin J. Barish

[57] ABSTRACT

A faucet includes a shut-off valve between its inlet connection and its spout, and a valve operator extending below the spout so as to be engageable by a user's hand when located below the spout to receive the water discharged therefrom. The valve operator comprises a stem passing through the spout and a latching device which latches the valve in the "on" position by one operation of the valve operator, and in the "off" position by the next operation.

17 Claims, 3 Drawing Sheets

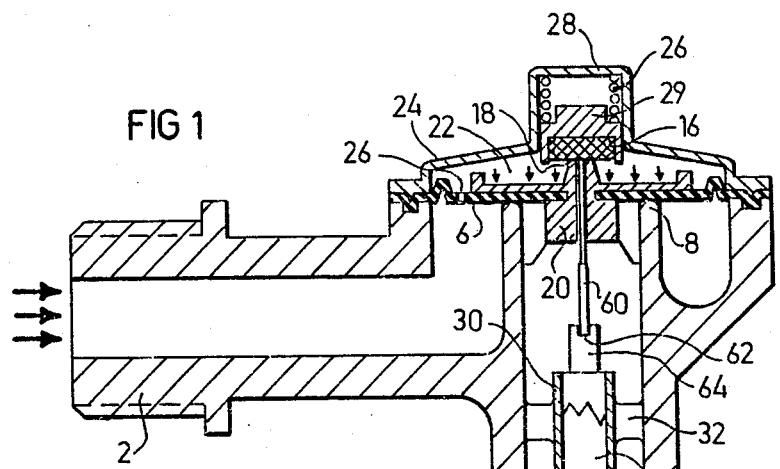
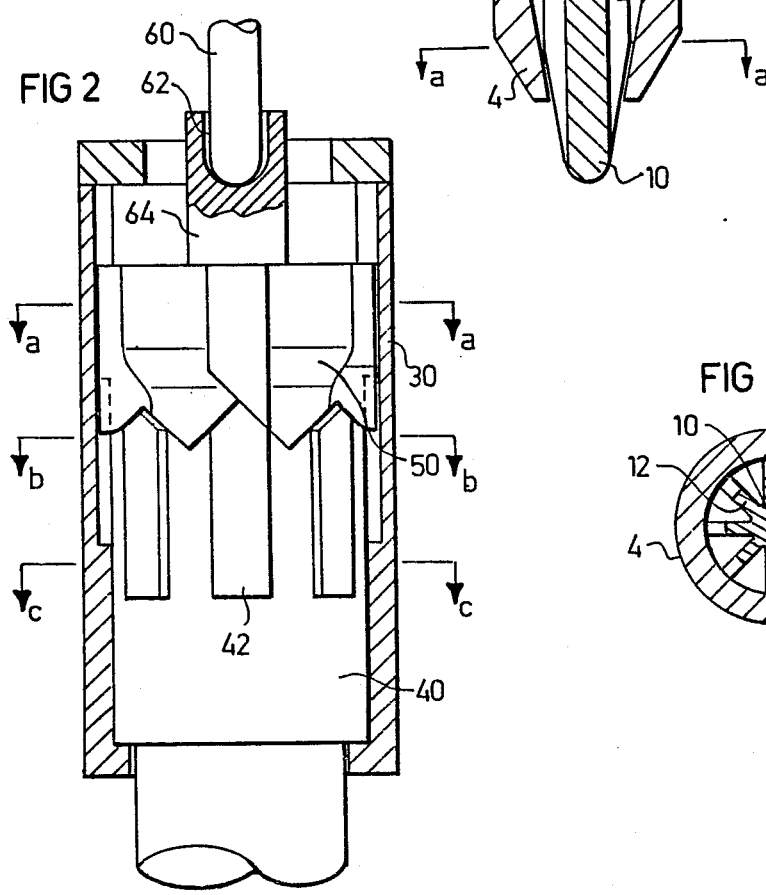
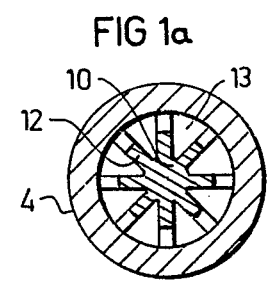

HAND-CONTROLLED FAUCET

BACKGROUND OF THE INVENTION

The present invention relates to a hand-controlled faucet, and particularly to one which may be conveniently turned "on" or "off" by a simple manipulation of the hand and without requiring the user to grasp a knob for this purpose.

The conventional faucet includes a knob which is grasped by the user in order to turn-on and turn-off the faucet. Such a conventional faucet has a number of drawbacks. Thus, after the user has washed his hands, he must again grasp the knob to turn-off the water, and therefore any contamination on the knob may be transferred to the user's washed hands. In addition, the extra manipulation required in order to turn-off the faucet is wasteful of water.

Several types of faucet constructions have been proposed to avoid these drawbacks. One type includes a foot pedal which is operated by the user to turn-on and turn-off the water flow; however, this type requires substantial mechanism between the foot pedal and the faucet shut-off valve, which makes the faucet expensive to produce and to maintain. Another type of faucet includes an electrical or optical sensor which is controlled by the position of the user's hands in order to turn-on or turn-off the water flow; such a construction, however, involves electrical or optical elements which also make the faucet expensive to produce and to maintain.

An object of the present invention is to provide a new type of hand-controlled faucet avoiding the above drawbacks.

BRIEF SUMMARY OF THE INVENTION

According to the present invention, there is provided a faucet including an inlet connection connectable to a pressurized water supply line, and a vertically extending outlet spout open at its lower end through which the water from the supply line is downwardly discharged; characterized in that the faucet further includes a shut-off valve between the inlet connection and the spout, and operated by a valve operator comprising a vertically-extending stem passing through the spout and projecting through and below its lower end so as to be engageable by a user's hand when located below the spout to receive the water discharged therefrom. The vertically-extending stem is formed with a plurality of axially-extending, circumferentially-spaced ribs defining passageways for the discharge of the water through the spout. In addition, the valve operator includes a latching device which latches the valve in the "on" position by one operation of the valve operator, and in the "off" position by the next operation of the valve operator.

According to a still further important feature in the described preferred embodiment, the latching device comprises a rotatable indexing mechanism which is indexed one rotary increment with each operation of the valve operator to successively move the valve to its "on" and "off" positions.

The rotatable indexing mechanism may be of the type commonly used in ballpoint pens for projecting and retracting the ballpoint with each operation of the actuator pin.

In the described preferred embodiment, the shut-off valve includes a displaceable member movable to an "on" position or to an "off" position, a pressure chamber controlling the position of the displaceable member, a pilot valve member controlling the pressure in the pressure chamber, and a mechanical connection between the valve operator and the pilot valve member. More particularly, the displaceable member is a diaphragm displaceable in response to the pressure in the pressure chamber with respect to an annular valve seat between the inlet connection and the outlet spout. The diaphragm is formed with a vent opening venting the inlet connection to the pressure chamber, and carries a hollow stem at its center having an orifice engaged by the pilot valve member during one operation of the valve operator, and disengaged therefrom during the next operation of the valve operator.

It will thus be seen that a faucet constructed in accordance with the foregoing features permits the shut-off valve to be actuated for turning on the water flow by merely lifting and releasing the valve operator located below the spout, and then to be turned off by again lifting and releasing the valve operator. The faucet thus obviates the need to grasp a knob in order to turn-off the faucet, and therefore avoids the possibility of the user recontaminating his hands after having washed them. In addition, the faucet permits substantial savings in water since the user can conveniently operate it while his hands are still under the spout.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a longitudinal sectional view illustrating one form of faucet constructed in accordance with the present invention, FIG. 1a being a sectional view along line a—a of FIG. 1;

DESCRIPTION OF A PREFERRED EMBODIMENT

Figure 2A:
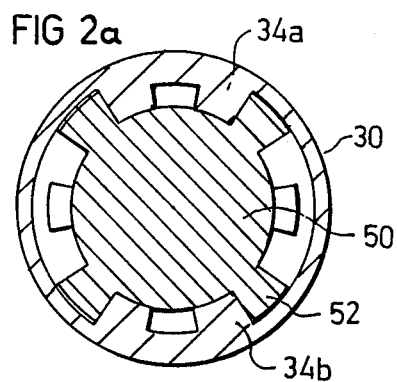
FIG. 2 is an enlarged fragmentary view illustrating the latching device in the faucet of FIG. 1 for latching the valve in either its "on" or "off" position, FIGS. 2a, 2b and 2c being sectional views along lines a—a, b—b and c—c of FIG. 2.

The faucet illustrated in the drawings includes an inlet connection 2 connectable to a pressurized water supply line (not shown), and an outlet spout 4 through which the water from the supply line is discharged. The illustrated faucet further includes a shut-off valve comprising a diaphragm 6 displaceable with respect to an annular valve seat 8 to control the flow of the water from the inlet connection 2 to the spout 4. Diaphragm 6 is controlled by a stem 10, serving as a valve operator, passing through spout 4 so as to extend below the spout in a position to be engageable by a user's hand when located below the spout to receive the discharged water. Stem 10 is formed with a plurality of axially-extending, circumferentially-spaced ribs 12 defining passageways 13 (FIG. 1a) for the discharge of the water through the spout when diaphragm valve 6 is in its open position.

As shown in FIG. 1, a latching device, generally designated 14, is disposed between the valve operator stem 10 and diaphragm 6 and serves to latch the diaphragm valve in the "on" position by one operation of the valve operator stem 10, and in the "off" position by the next operation of the valve operator stem. For this purpose, latching device 14 comprises a rotatable indexing mechanism more particularly illustrated in FIGS. 2 and 2a–2c, and operated in the manner illustrated in FIGS. 3a–3c, as will be described below.

Diaphragm 6 is controlled by valve operator stem 10 via a pilot valve member 16 which is moved with respect to an orifice 18 formed in a hollow stem 20 passing through the center of diaphragm 6. For this purpose, the illustrated faucet includes a pressure chamber 22 defined at one side by diaphragm 6, and at the other side by end wall 24 of the faucet. Diaphragm 6 is formed with a vent opening 26 which permits the pressure within chamber 22 to build up to the inlet pressure when the pilot valve member 16 is in its closed position, as illustrated in FIG. 1, seated over orifice 18. Valve member 16 is normally biassed to this position by a spring 26 disposed within a cylindrical socket 28 formed in housing end wall 24, and bearing against a cap 29 received over the pilot valve member 16. Pilot valve member 16 is lifted to its raised position unseated from orifice 18 (FIG. 4), and is retained in its raised position, by the latching device 14 when water is to be discharged through the spout 4, as will be described more particularly below.

Latching device 14, as shown in FIGS. 2 and 2a–2c, comprises three main members: namely a housing 30, a plunger 40, and a rotary indexing disc 50. Housing 30 is secured by radial ribs 32 to the inner face of spout 4, and is formed with axially-extending ribs 34a on one inner face, and similar ribs 34b on the opposite inner face. Plunger 40 has a plurality of axially-extending ribs 42 at its upper end receivable within housing 30, the lower end of the plunger being coupled to the valve operator 10 so as to be liftable thereby. The rotatable indexing disc 50 is disposed within housing 30 between its ribs 34 and ribs 42 at the upper end of plunger 40. Indexing disc 50 is similarly formed with a plurality of axially-extending ribs 52 which are cooperable with ribs 34 of housing 30, and ribs 42 of plunger 40, to sequentially raise and lower disc 50, and thereby the pilot valve member 16, with each operation of plunger 10.

The pilot valve member 16 is coupled to disc 50 of the latching mechanism 14 by means of a rod 60 passing through the hollow stem 20 and secured at its upper end to the pilot valve member. The lower end of rod 60 is seated within a socket 62 (FIG. 2) formed at the upper end of a stem 64 carried by disc 50. Socket 62 is of larger diameter than rod 60, and its bottom is of semi-spherical configuration so as to permit rotary movement of disc 50 with respect to the lower end of rod 60, which is also of semi-spherical configuration. Spring 26 at the upper end of the pilot valve urges the pilot valve member 16 downwardly to maintain the lower end of rod 60 in contact with the semi-spherical bottom surface of socket 62, and thereby also to urge rotatable disc 50 of the latching mechanism 14 into contact with ribs 34 of the housing 30 and ribs 42 of the plunger 40.

Figure 3A:
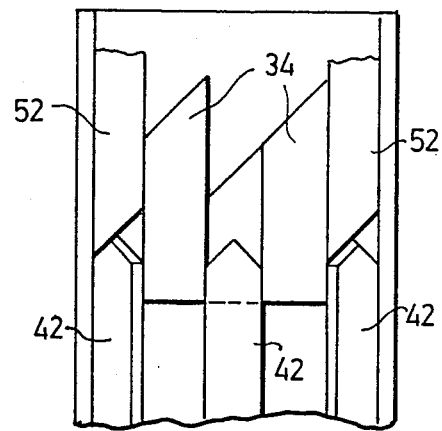
FIGS. 3a, 3b and 3c illustrate three stages in the operation of the latching device of FIG. 2.
Figure 2B:
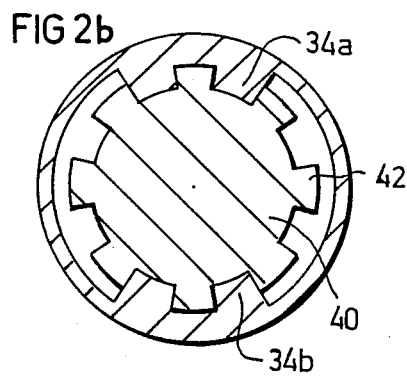
Figure 3B:
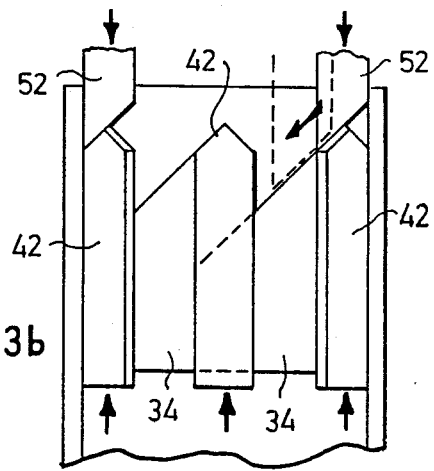
Figure 2C:
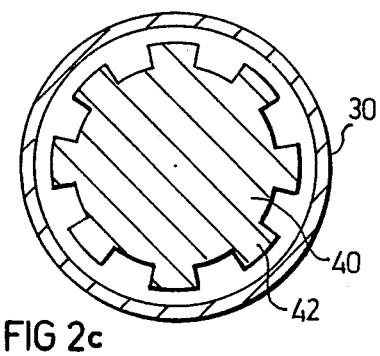
Figure 3C:
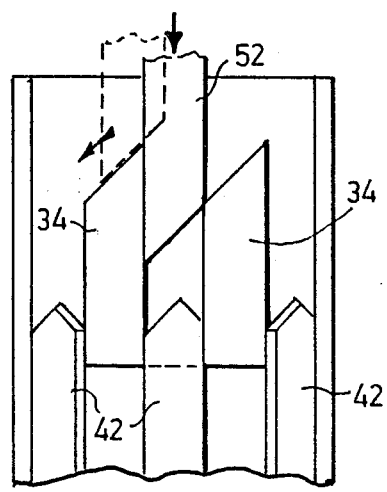
Figure 4:
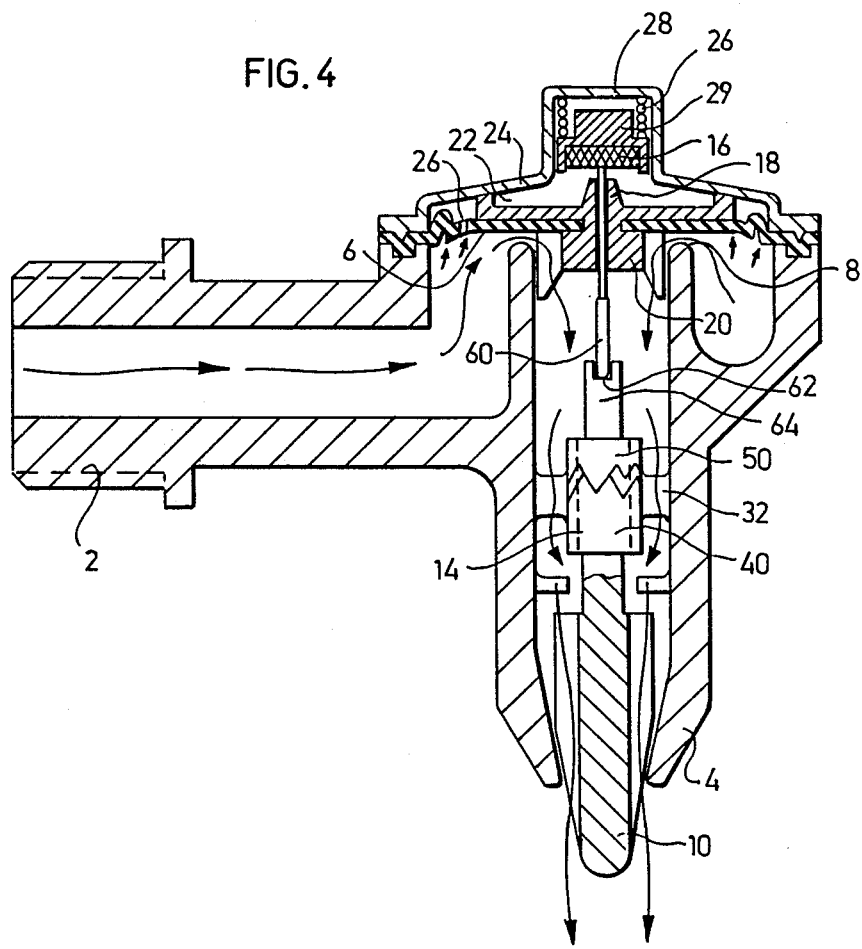
FIG. 4 is a sectional view corresponding to that of FIG. 1 but illustrating the shut-off valve in its "on" position for discharging water through the spout.

The structure and mode of operation of the latching device 14 is basically the same as in the extension-retraction mechanism of a ballpoint pen. First, assume the indexing disc 50 is in its lower position as illustrated in FIG. 3a, wherein the pilot valve member 16 is also in its lowered position seated against the orifice 18 of stem 20. When valve operator 10 is raised, ribs 42 of housing 40 engage ribs 52 of disc 50 to lift the disc, as shown in FIG. 3b; and when valve operator 10 is released, its weight causes it to return to its lower position as shown in FIG. 3c. During the latter movement, ribs 52 of disc 50, under the urge of spring 26, move downwardly along the upper faces of the housing ribs 34 to the position illustrated in FIG. 3c. This is the upper stable position of disc 50, wherein the pilot valve member 16 is in its upper position, as illustrated in FIG. 4, unseated from orifice 18 of stem 20, thereby opening the pilot valve. During the next lifting and release operation of valve operator 10, disc 50 will be moved to its lower position as illustrated in FIG. 3a, wherein the pilot valve member 16 is seated against orifice 18 of stem 20, thereby closing the pilot valve.

The overall operation of the illustrated faucet will now be apparent from the above description. Thus, when pilot valve member 16 is in its lowered position seated against orifice 18 of the hollow stem 20, as illustrated in FIG. 1, the pressure within chamber 22 builds up to that of the inlet pressure via opening 26 in diaphragm 6. The surface area of the diaphragm subject to the pressure within chamber 22 is greater than that subject to the inlet pressure, and accordingly diaphragm 6 is firmly pressed downwardly seated against annular opening 8, thereby shutting-off the flow of water from the inlet connection 2 to the spout 4.

In order to turn-on the flow of water through the spout, the user places his hands below valve operator 10 passing through the spout 4 in position to receive water from the spout, and lifts the valve operator with his hands. This indexes the latching mechanism 14 one position, in the manner described above and more particularly illustrated in FIGS. 3a–3c, to move disc 50 of the latching mechanism to its raised position (FIG. 3c). This moves the pilot valve member 16 also to its raised position as illustrated in FIG. 4, wherein the pilot valve member 16 is unseated from orifice 18 of the hollow stem 20. The water within chamber 22 then discharges through the hollow stem 20, thereby releasing the pressure in chamber 22. When this occurs, the inlet pressure acting on diaphragm 6, no longer being opposed by the pressure within chamber 22, displaces the diaphragm so as to unseat it from annular opening 8 thereby producing a discharge of water from the inlet connection 2 via spout 4 onto the hands of the user.

This discharge of water continues until the user again, with his hands located under the spout, lifts valve operator 10 to index the latching mechanism 14 to the lower position (FIG. 3a) of indexing disc 50, thereby reseating the pilot valve member 16 onto orifice 18 of the hollow stem 20. This causes the pressure within chamber 22 again to build up to the inlet pressure, thereby displacing diaphragm 6 against valve seat 8 and terminating the flow of water through the spout 4.

It will thus be seen that the illustrated faucet may be conveniently operated by the user by merely lifting and then releasing valve operator 10 to turn-on the flow of water, and then again lifting and releasing the valve operator to turn-off the flow of water. These operations may be conveniently done by the user's hands while disposed under the spout, thereby obviating the need to touch a faucet knob after washing his hands which could recontaminate his washed hands. This operation of the valve also saves time, and thereby water, in turning off the faucet.

It will thus be seen that no knob is required for operating the shut-off valve in order to turn-on or turn-off the water flow. A knob could be provided, however, in order to preset the rate of flow of water when the shut-off valve is turned on, but the operation of such a knob would normally be done before the shut-off valve is operated, thereby preserving the benefits of the illustrated hand-control faucet in avoiding the possibility of recontaminating the user's hands after having washed them, and also saving water by reducing the time required to turn-off the water flow.

Many other variations, modifications and applications of the invention will be apparent.

What is claimed is:

1. A faucet including an inlet connection connectable to a pressurized water supply line, and a vertically-extending outlet spout open at its lower end through which the water from the supply line is downwardly discharged; characterized in that said faucet further includes a shut-off valve between said inlet connection and said spout, and a valve operator comprising a vertically-extending system passing through said spout and projecting through and below its lower open end so as to be engageable by a user's hand when located below the spout to receive the water discharged therefrom, said valve operator being coupled to said shut-off valve to operate same, said vertically-extending stem being formed with a plurality of axially-extending, circumferentially-spaced ribs defining passageways for the discharge of the water through said spout; said valve operator including a latching device which latches the valve in the "on" position by one operation of the valve operator, and in the "off" position by the next operation of the valve operator.

2. The faucet according to claim 1, wherein said latching device comprises a rotatable indexing mechanism which is indexed one rotary increment with each operation of the valve operator to successively move the valve to its "on" and "off" positions.

3. The faucet according to claim 1, wherein said shut-off valve includes a displaceable member movable to an "on" position or to an "off" position, a pressure chamber controlling the position of said displaceable member, a pilot valve member controlling the pressure in said pressure chamber, and a mechanical connection between said valve operator and said pilot valve member.

4. The faucet according to claim 3 wherein said displaceable member is a diaphragm displaceable in response to the pressure in said pressure chamber with respect to an annular valve seat between said inlet connection and said outlet spout.

5. The faucet according to claim 4, wherein said diaphragm is formed with a vent opening venting the inlet connection to said pressure chamber, and carries a hollow stem at its center having an orifice engaged by said pilot valve member during one operation of the valve operator, and disengaged therefrom during the next operation of the valve operator.

6. The faucet according to claim 5, wherein said latching device latches the pilot valve member in its engaged position with respect to said hollow stem orifice during one operation of the valve operator and in its disengaged position during the next operation of the valve operator.

7. The faucet according to claim 6, wherein said latching device comprises a rotatable indexing mechanism which is indexed one rotary increment with each operation of the valve operator and is coupled to said pilot valve member to successively move it to its engaged position and then to its disengaged position, with respect to said hollow stem orifice, during successive operations of the valve operator.

8. The faucet according to claim 7, wherein said rotatable indexing mechanism comprises: a housing formed with ribs on its inner face, a plunger having an upper end formed with ribs receivable within said housing and a lower end coupled to said valve operator so as to be liftable thereby, and a rotatable indexing disc disposed within said housing between its ribs and said upper end of the plunger and coupled to said pilot valve member, said indexing disc being formed with ribs cooperable with the ribs of said housing and plunger such that when the valve operator is first lifted and released, it lifts the indexing disc to unseat the pilot valve member from the hollow stem orifice and to rotate the indexing disc one increment of rotary movement, and when the valve operator is next lifted and released, it rotates the indexing disc another increment of rotary movement and lowers the indexing disc to seat the pilot valve member onto the hollow stem orifice.

9. The faucet according to claim 8, wherein said rotatable indexing mechanism is coupled to said pilot valve by a rod passing through said diaphragm and said hollow stem.

10. The faucet according to claim 8, wherein said pilot valve member further includes a spring normally urging it into engagement with said hollow stem orifice.

11. The faucet according to claim 10, wherein one end of said rod is fixed to said pilot valve member, and the opposite end bears against said rotatable indexing mechanism.

12. A faucet including: an inlet connection connectable to a pressurized water supply line; a vertically-extending outlet spout open at its lower end through which the water from the supply line is downwardly discharged; a shut-off valve between said inlet connection and said spout; and a valve operator comprising a vertically-extending stem passing through said spout and projecting through and below its lower open end so as to be liftable by a user's hand when located below the spout to receive the water discharged therefrom; said valve stem being coupled to said shut-off valve to operate same when lifted and being formed with a plurality of axially-extending circumferentially-spaced ribs defining passageways for the discharge of the water through said spout; said valve stem being coupled to a latching device which latches the valve in the "on" position by one lifting of the valve stem, and in the "off" position by the next lifting of the valve stem.

13. The faucet according to claim 12, wherein said shut-off valve includes a displaceable member movable to an "on" position or to an "off" position, a pressure chamber controlling the position of said displaceable member, a pilot valve member controlling the pressure in said pressure chamber, and a mechanical connection between said valve operator and said pilot valve member.

14. The faucet according to claim 13, wherein said displaceable member is a diaphragm displaceable in response to the pressure in said pressure chamber with respect to an annular valve seat between said inlet connection and said outlet spout.

15. The faucet according to claim 14, wherein said diaphragm is formed with a vent opening venting the inlet connection to said pressure chamber, and carries a hollow stem at its center having an orifice engaged by said pilot valve member during one lifting of the valve stem, and disengaged therefrom during the next lifting of the valve stem.

16. The faucet according to claim 15, wherein said valve stem includes a latching device which latches the pilot valve member in its engaged position with respect to said hollow stem orifice during one lifting of the valve stem, and in its disengaged position during the next lifting of the valve stem.

17. The faucet according to claim 16, wherein said rotatable indexing mechanism is coupled to said pilot valve by a rod passing through said diaphragm and said hollow stem.

* * * * *